(12) United States Patent
Boyte et al.

(10) Patent No.: US 11,761,815 B2
(45) Date of Patent: Sep. 19, 2023

(54) WEIGHT SENSING COOLER ASSEMBLY

(71) Applicants: Braxton Boyte, Oklahoma City, OK (US); Jeff Wooden, Oklahoma City, OK (US)

(72) Inventors: Braxton Boyte, Oklahoma City, OK (US); Jeff Wooden, Oklahoma City, OK (US)

( * ) Notice: Subject to any disclaimer, the term of this patent is extended or adjusted under 35 U.S.C. 154(b) by 314 days.

(21) Appl. No.: 17/203,963

(22) Filed: Mar. 17, 2021

(65) Prior Publication Data

US 2022/0299249 A1     Sep. 22, 2022

(51) Int. Cl.

| G01G 19/42 | (2006.01) |
|---|---|
| G01G 19/52 | (2006.01) |
| F25D 3/06 | (2006.01) |
| B65D 43/22 | (2006.01) |
| F25D 29/00 | (2006.01) |
| B65D 43/16 | (2006.01) |
| B65D 81/38 | (2006.01) |
| G01G 19/387 | (2006.01) |

(52) U.S. Cl.
CPC .......... *G01G 19/42* (2013.01); *B65D 43/165* (2013.01); *B65D 43/22* (2013.01); *B65D 81/3825* (2013.01); *F25D 3/06* (2013.01); *F25D 29/003* (2013.01); *G01G 19/387* (2013.01); *G01G 19/52* (2013.01); *F25D 2400/36* (2013.01); *F25D 2700/06* (2013.01)

(58) Field of Classification Search
CPC .... G01G 19/42; G01G 19/4144; G01G 19/52; G01G 21/28; F25D 3/06; F25D 29/003; F25D 2400/36; F25D 2700/06; B65D 43/165; B65D 43/22; B65D 81/3825
See application file for complete search history.

(56) References Cited

U.S. PATENT DOCUMENTS

| 4,891,755 | A | * | 1/1990 | Asher | ............... G06Q 40/12 |
|---|---|---|---|---|---|
| | | | | | 705/28 |
| 4,904,007 | A | * | 2/1990 | Woodruff | ............. E05B 65/102 |
| | | | | | 292/341.15 |
| 5,837,944 | A | | 11/1998 | Herat | |
| 8,157,437 | B2 | | 4/2012 | Richmond | |
| 9,833,093 | B2 | | 12/2017 | Pinhasov | |
| 10,670,451 | B2 | * | 6/2020 | Dixon, Jr. | ............. B65D 79/00 |
| 2007/0119195 | A1 | * | 5/2007 | Meredith | ............... F25D 29/00 |
| | | | | | 62/137 |
| 2013/0008941 | A1 | | 1/2013 | Morris | |
| 2014/0048551 | A1 | | 2/2014 | Slipe | |
| 2018/0332989 | A1 | | 11/2018 | Chiu | |
| 2019/0368809 | A1 | | 12/2019 | Jafa | |

* cited by examiner

*Primary Examiner* — Randy W Gibson

(57) ABSTRACT

A weight sensing cooler assembly includes a cooler that is comprised of a thermally insulating material for storing cooled beverages. A scale is movably integrated into the cooler for measuring the weight of the cooler. Moreover, the scale compares the weight of the cooler against a predetermined baseline weight to determine the number of cooled beverages in the cooler. A display unit is coupled to the cooler wherein the display unit is configured to be visible to a user. The display unit is in electrical communication with the scale thereby facilitating the display unit to display a visual representation of the number of the cooled beverages in the cooler. In this way the display unit can communicate the number of cooled beverages to the user.

7 Claims, 6 Drawing Sheets

WEIGHT SENSING COOLER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cooler devices and more particularly pertains to a new cooler device for displaying the number of beverages stored in a cooler. The device includes a cooler that has a digital scale integrated therein for weighing the cooler. Additionally, the digital scale includes a control circuit that calculates the number of canned beverages that remains in the cooler based upon the weight of the cooler.

(2) Description of Related Art Including Information Disclosed Under 37 CFR 1.97 and 1.98

The prior art relates to cooler devices including a variety of beverage insulators that have electronic means of counting the number of canned beverages that have been inserted into the beverage insulators. The prior art also discloses a digital scale that is calibrated to determine the volume of beer contained in a beer keg. The prior art discloses a variety of digital scale devices that are calibrated to determine the fluid volume of a variety of fluid containers. In no instance does the prior art disclose a cooler with a scale integrated therein to determine the number of canned beverages in the cooler based upon the weight of the cooler.

BRIEF SUMMARY OF THE INVENTION

An embodiment of the disclosure meets the needs presented above by generally comprising a weight sensing cooler assembly includes a cooler that is comprised of a thermally insulating material for storing cooled beverages. A scale is movably integrated into the cooler for measuring the weight of the cooler. Moreover, the scale compares the weight of the cooler against a pre-determined baseline weight to determine the number of cooled beverages in the cooler. A display unit is coupled to the cooler wherein the display unit is configured to be visible to a user. The display unit is in electrical communication with the scale thereby facilitating the display unit to display a visual representation of the number of the cooled beverages in the cooler. In this way the display unit can communicate the number of cooled beverages to the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
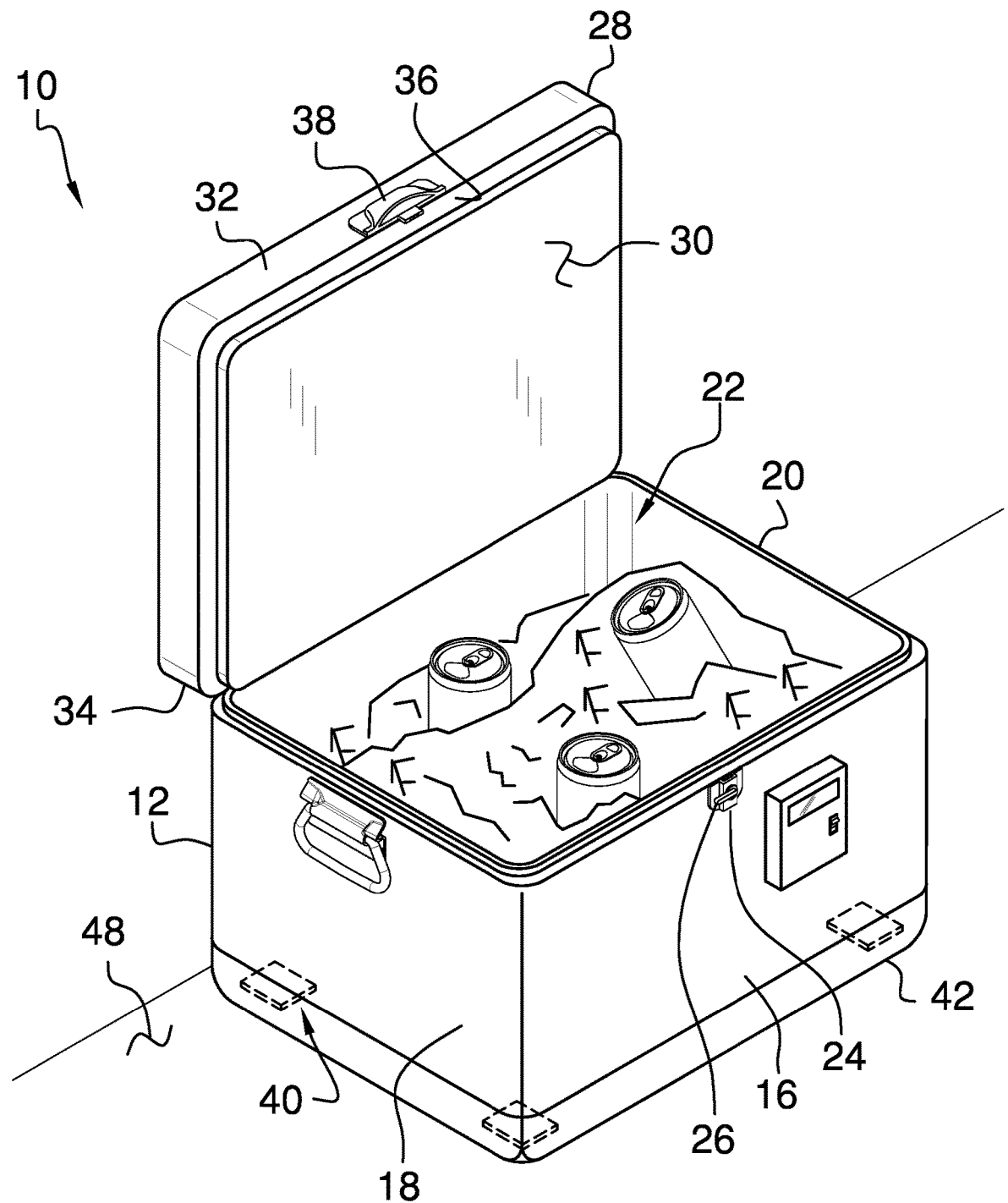
FIG. 1 is a front perspective view of a weight sensing cooler assembly according to an embodiment of the disclosure.
Figure 2:
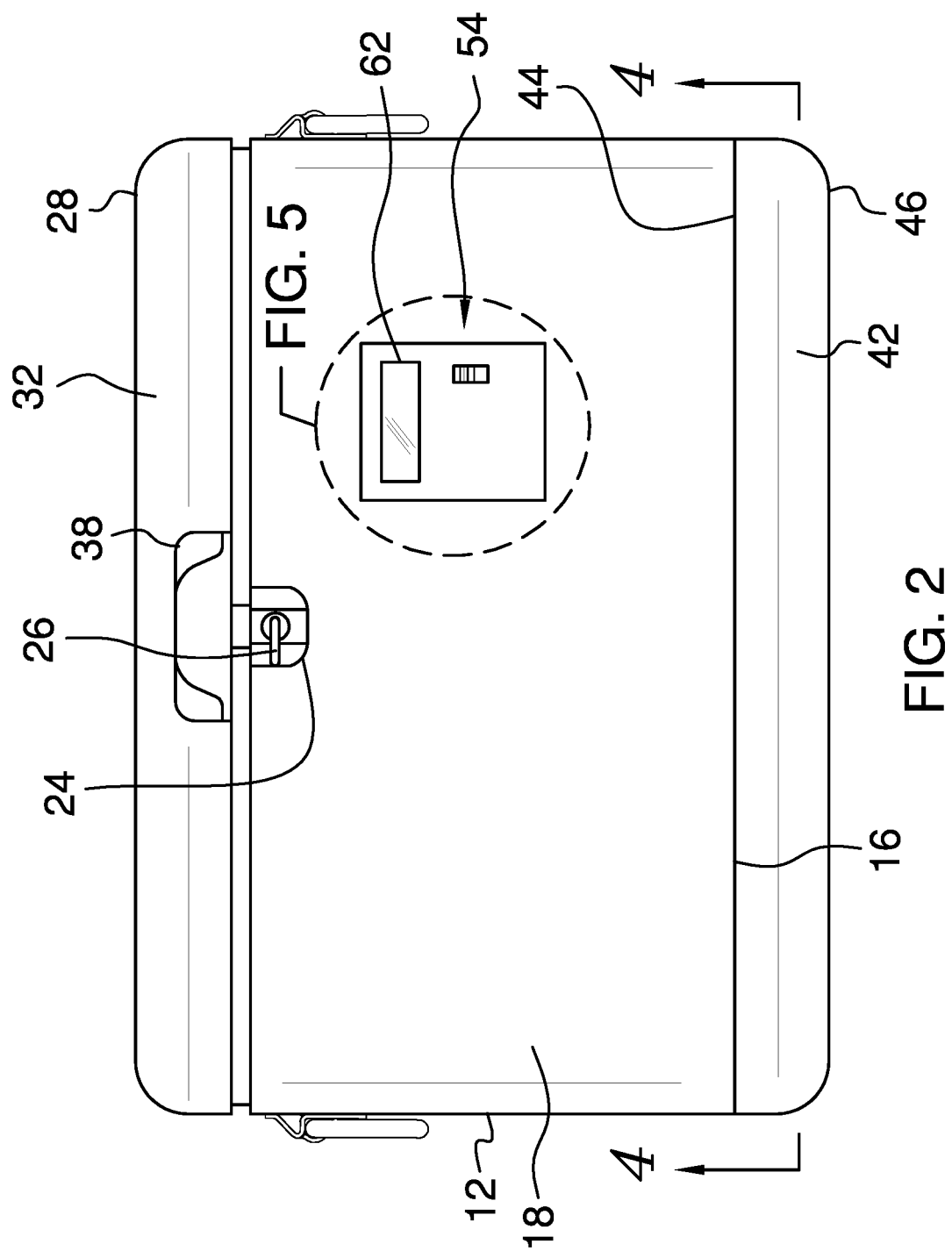
FIG. 2 is a front view of an embodiment of the disclosure.
Figure 3:
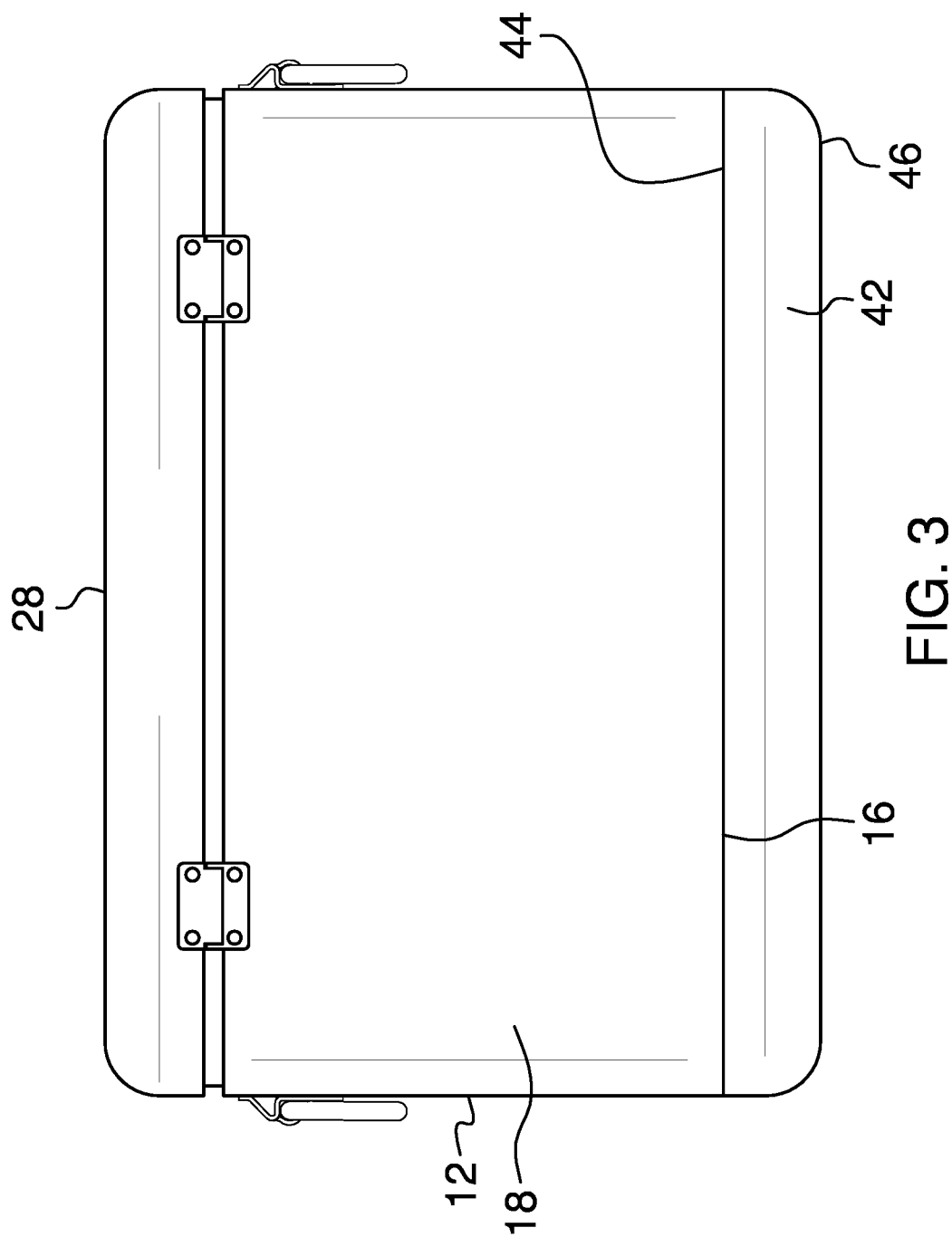
FIG. 3 is a back view of an embodiment of the disclosure.
Figure 4:
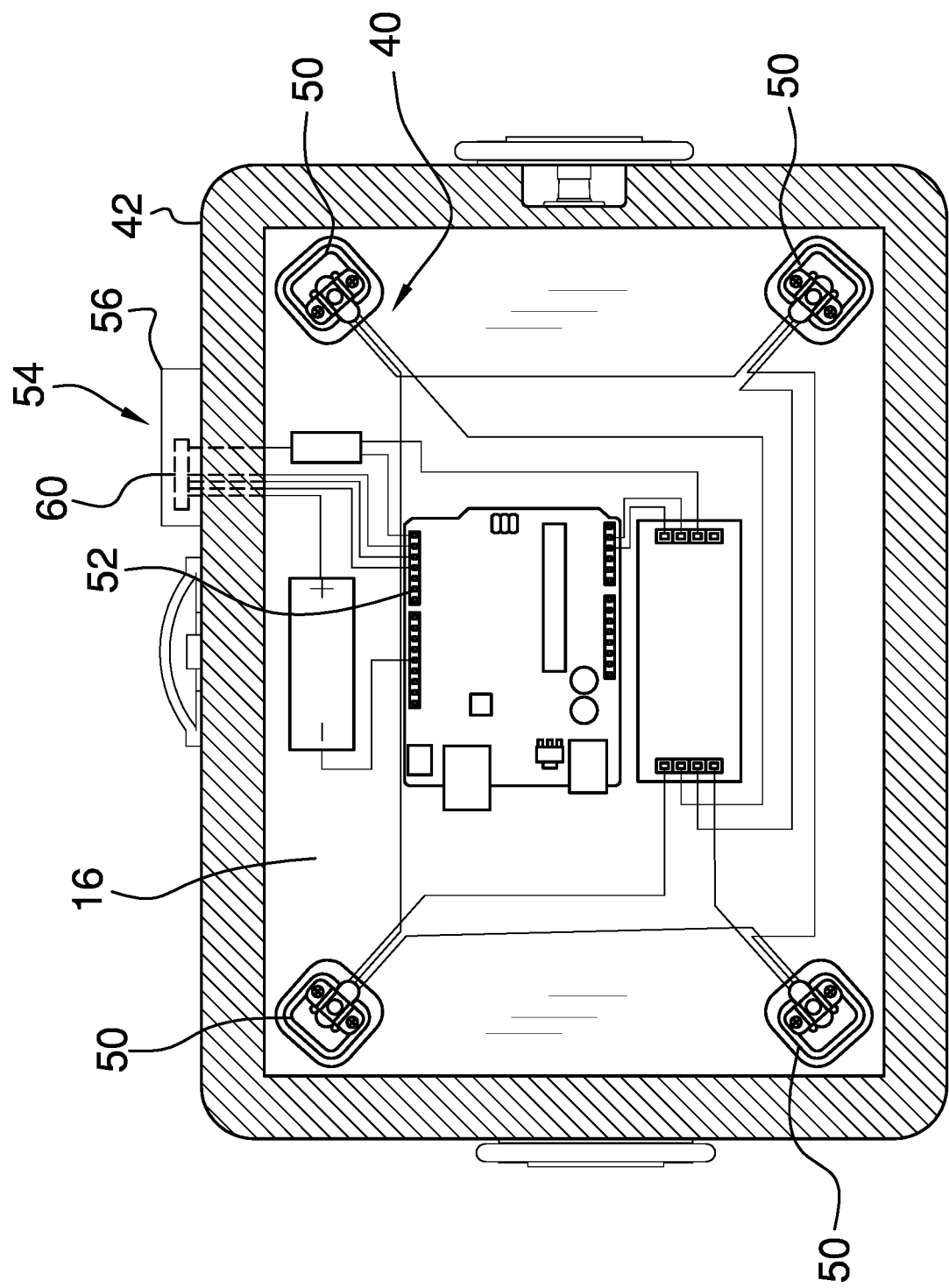
FIG. 4 is a cross sectional view taken along line 4-4 of FIG. 2 of an embodiment of the disclosure.
Figure 5:
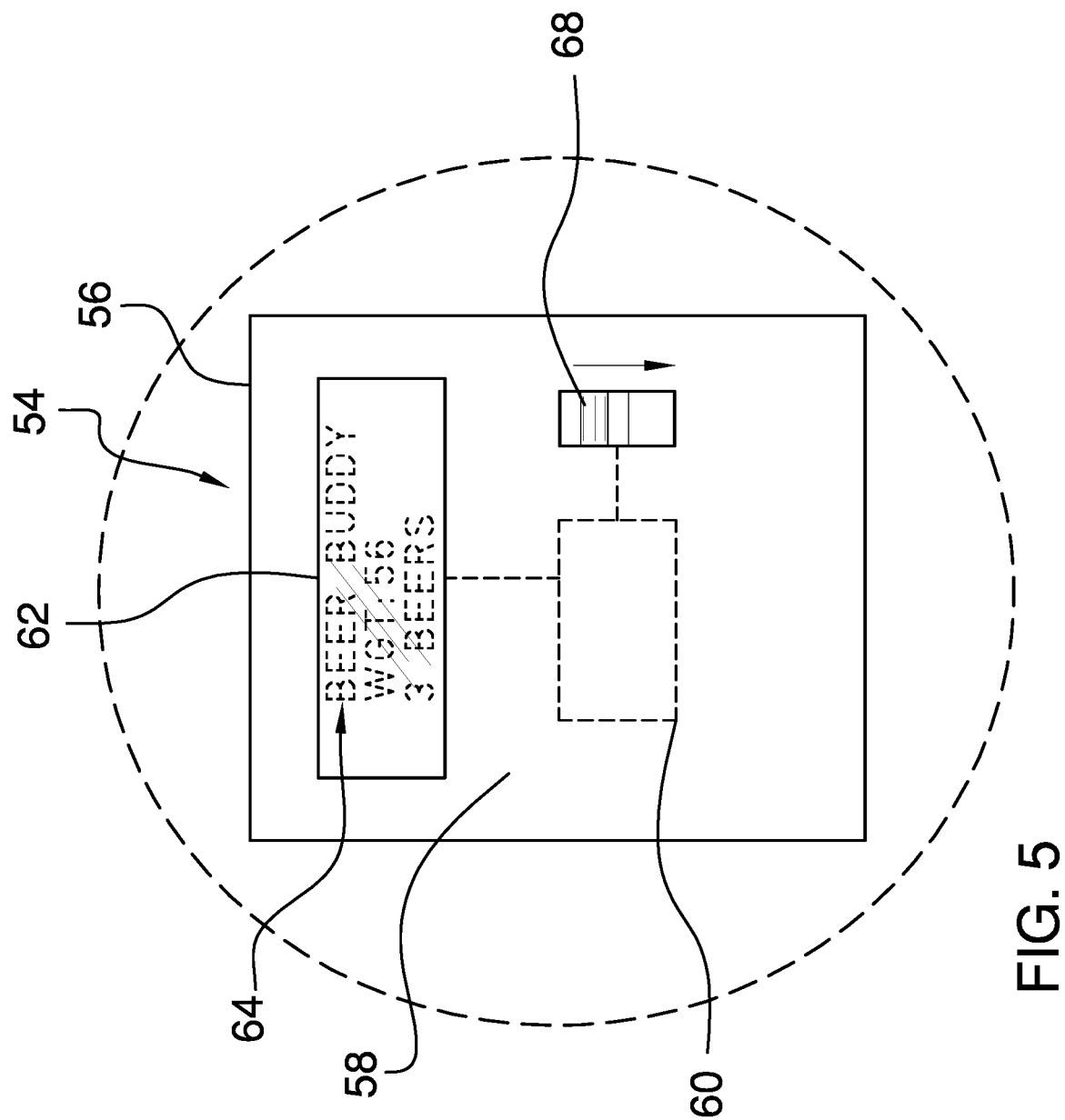
FIG. 5 is a detail view taken from circle 5 of FIG. 2 of an embodiment of the disclosure.
Figure 6:
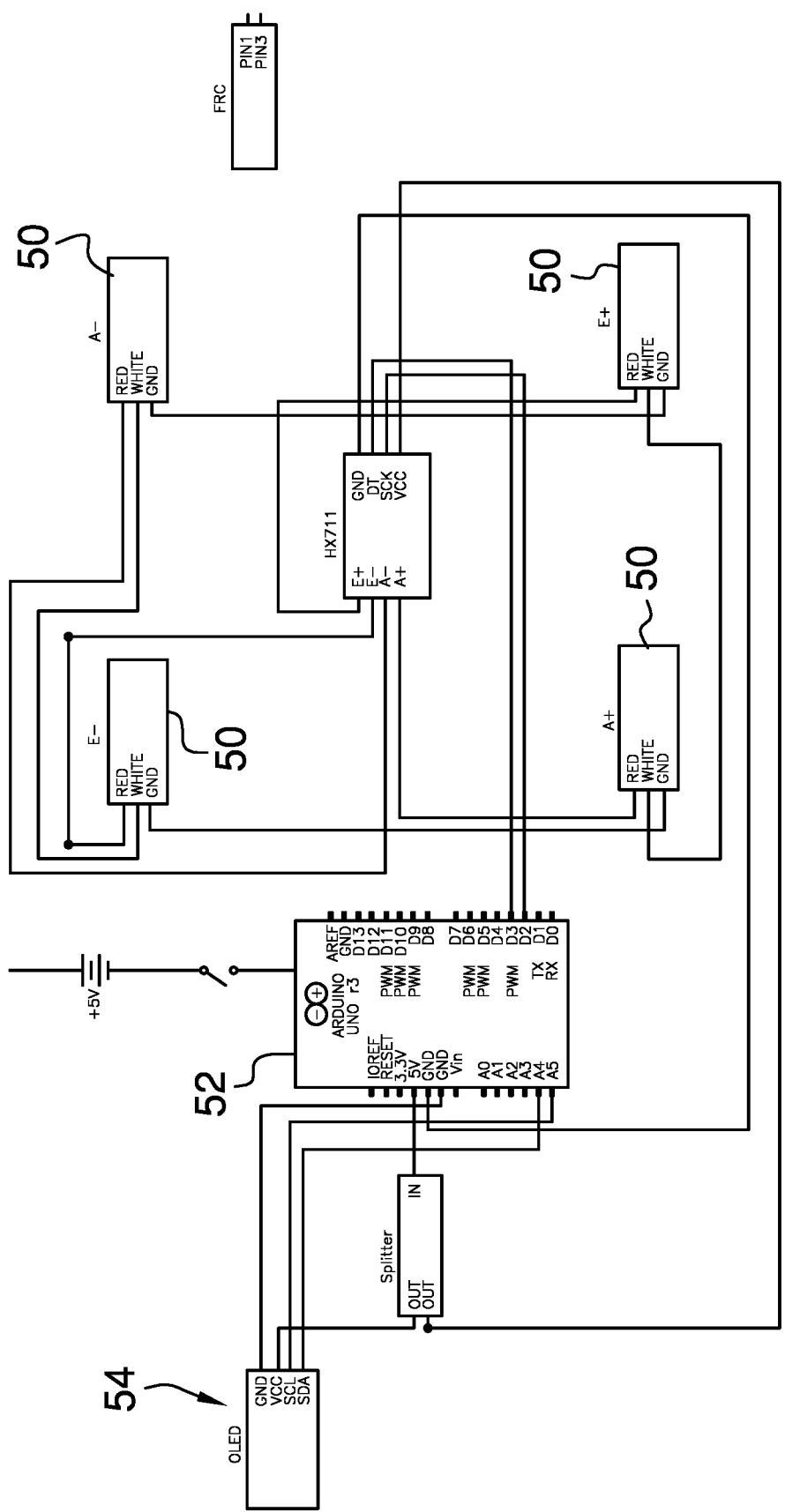
FIG. 6 is a schematic view of a scale control circuit of an embodiment of the disclosure.

With reference now to the drawings, and in particular to FIGS. 1 through 6 thereof, a new cooler device embodying the principles and concepts of an embodiment of the disclosure and generally designated by the reference numeral 10 will be described.

As best illustrated in FIGS. 1 through 6, the weight sensing cooler assembly 10 generally comprises a cooler 12 that is comprised of a thermally insulating material for storing cooled beverages 14. The cooler 12 has a bottom wall 16 and an outer wall 18 extending upwardly therefrom, and the outer wall 18 has a distal edge 20 with respect to the bottom wall 16 to define an opening 22 into the cooler 12. A lock 24 is coupled to the outer wall 18 of the cooler 12 and the lock 24 is positioned adjacent to the distal edge 20 of the outer wall 18. A lever 26 is rotatably integrated into the lock 24 and the lever 26 moves the lock 24 between a locked condition and an unlocked condition.

A lid 28 is hingedly coupled to the cooler 12 for opening and closing the cooler 12. The lid 28 is comprised of a thermally insulation material to facilitate storing the cooled beverages 14. The lid 28 has a lower surface 30, a front edge 32 and a back edge 34, and the back edge 34 is hingedly coupled to the distal edge 20 of the outer wall 18 of the cooler 12. The lower surface 30 has a recess 36 extending around an entire perimeter of the lid 28 and the recess 36 accommodates the distal edge 20 of the outer wall 18 when the lid 28 is closed. An engagement 38 is coupled to the front edge 32 of the lid 28 and the engagement 38 engages the lock 24 when the lid 28 is closed. The engagement 38 is locked to the lock 24 when the lock 24 is in the locked condition to inhibit the lid 28 from is opened. Conversely, the engagement 38 is unlocked from the lock 24 when the lock 24 is in the unlocked condition to facilitate the lid 28 to be opened.

A scale 40 is movably integrated into the cooler 12 such that the scale 40 is in mechanical communication with the cooler 12. In this way the scale 40 can measure the weight of the cooler 12. The scale 40 compares the weight of the cooler 12 against a pre-determined baseline weight to determine the number of cooled beverages 14 in the cooler 12. The scale 40 comprises a base 42 that has a top side 44 and a bottom side 46. The base 42 is disposed on the bottom wall 16 of the cooler 12 having the top side 44 being directed toward the bottom wall 16. Moreover, the bottom side 46 of the base 42 rests on a support surface 48, such as the ground or other horizontal support surface, when the cooler 12 is placed on the support surface 48.

The scale 40 includes a plurality of weight sensors 50 that is each positioned between the bottom wall 16 of the cooler 12 and the top side 44 of the base 42. In this way each of the weight sensors 50 senses the weight of the bottom wall 16 of the cooler 12 when the cooler 12 is placed on the support surface. Each of the weight sensors 50 may be aligned with a respective one of four corners of the base 42 and each of the weight sensors 50 may comprise an electronic weight sensor.

The scale 40 includes a scale control circuit 52 that is integrated into the base 42. Each of the weight sensors 50 is electrically coupled to the scale control circuit 52 such that the scale control circuit 52 receives a weight signal from each of the weight sensors 50. Additionally, the scale control circuit 52 stores data comprising the weight of a canned beverage 14 and the weight of the cooler 12 when the cooler 12 is empty. Moreover, the scale control circuit 52 compares the weight signal against the data to determine the difference between the weight communicated by the weight signal and the weight of the cooler 12 when the cooler 12 is empty. In this way the scale control circuit 52 determined the number of cooled beverages 14 that is being stored in the cooler 12. The scale control circuit 52 generates a number signal based on the difference between the weight communicated by the weight signal and the weight of the cooler 12. The cooled beverages 14 may be a canned beverage, such as beer, soda or other canned beverage that has a similar weight per quantity. As is most clearly shown in FIG. 6, the scale control circuit 52 may include an arduino uno processor, an HX711 processor and other electronic circuitry that is common to digital scales.

A display unit 54 is coupled to the cooler 12 such that the display unit 54 is visible to a user. The display unit 54 is in electrical communication with the scale 40 thereby facilitating the display unit 54 to display 62 a visual representation of the number of the cooled beverages 14 in the cooler 12. In this way the display unit 54 can communicate the number of cooled beverages 14 to the user. Thus, the user can determine when they will need to replenish the cooled beverages 14 in the cooler 12 without the need to manually count the cooled beverages 14.

The display unit 54 comprises a housing 56 that is coupled to the outer wall 18 of the cooler 12, and the housing 56 has a forward face 58. The display unit 54 includes a display control circuit 60 that is positioned in the housing 56. The display control circuit 60 is electrically coupled to the scale control circuit 52 such that the display control circuit 60 receives the number signal from the scale control circuit 52.

The display unit 54 includes a display 62 that is integrated into the forward face 58 of the housing 56 such that the display 62 is visible to the user. The display 62 is electrically coupled to the display control circuit 60 and the display 62 displays indicia 64 comprising numbers corresponding to the number signal. In this way the display 62 can visually display the number of cooled beverages 14 that are stored in the cooler 12. The display 62 may comprise a liquid crystal display or other type of electronic display. As is most clearly shown in FIG. 5, the indicia 64 may comprise the words "beer buddy", the numerical weight, in pounds, corresponding to the weight signal, and a number representing the number of cooled beverages 14 in the cooler 12.

A power supply 66 is provided and the power supply 66 is positioned in the base 42. The power supply 66 is electrically coupled to the scale control circuit 52 and the power supply 66 comprises at least one battery. A switch 68 is movably integrated into the forward face 58 of the housing 56. The switch 68 is electrically coupled to the display control circuit 60 to turn the display control circuit 60 on and off.

In use, the cooler 12 is filled with the cooled beverages 14 and the cooler 12 is transported to a desired location for consuming the cooled beverages 14. The scale 40 continually weighs the cooler 12 and the display 62 continually displays the number of cooled beverages 14 that has been calculated to remain in the cooler 12. In this way a user of the cooler 12 is continually notified as to how many cooled beverages 14 remain in the cooler 12. Thus, the user can identify the appropriate time to replenish the cooled beverages 14 without having to manually count the cooled beverages 14 in the cooler 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A weight sensing cooler assembly for determining the number of cooled beverages that are being stored, said assembly comprising:

a cooler being comprised of a thermally insulating material wherein said cooler is configured to store cooled beverages;

a lid being hingedly coupled to said cooler for opening and closing said cooler, said lid being comprised of a thermally insulation material wherein said lid is configured to facilitate storing the cooled beverages;

a scale being movably integrated into said cooler such that said scale is in mechanical communication with said cooler, said scale measuring the weight of said cooler, said scale comparing the weight of said cooler against a pre-determined baseline weight to determine the number of cooled beverages in said cooler;

a display unit being coupled to said cooler wherein said display unit is configured to be visible to a user, said display unit being in electrical communication with said scale thereby facilitating said display unit to display a visual representation of the number of the cooled beverages in said cooler wherein said display unit is configured to communicate the number of cooled beverages to the user;

wherein said scale includes a scale control circuit, said scale control circuit generating a number signal that represents the number of beverages in said cooler; and wherein said display unit comprises:
a housing being coupled to said outer wall of said cooler, said housing having a forward face; and
a display control circuit being positioned in said housing, said display control circuit being electrically coupled to said scale control circuit such that said display control circuit receives said number signal from said scale control circuit.

2. The assembly according to claim 1, wherein:
said cooler has a bottom wall and an outer wall extending upwardly therefrom, said outer wall having a distal edge with respect to said bottom wall to define an opening into said cooler;
said assembly includes a lock being coupled to said outer wall of said cooler, said lock being positioned adjacent to said distal edge of said outer wall, said lock having a lever being rotatably integrated into said lock wherein said lever is configured to be manipulated, said lever moving said lock between a locked condition and an unlocked condition;
said lid having a lower surface, a front edge and a back edge, said back edge being hingedly coupled to said distal edge of said outer wall of said cooler, said lower surface having a recess extending around an entire perimeter of said lid, said recess accommodating said distal edge of said outer wall when said lid is closed; and
an engagement being coupled to said front edge of said lid, said engagement engaging said lock when said lid is closed, said engagement being locked to said lock when said lock is in said locked condition to inhibit said lid from being opened, said engagement being unlocked from said lock when said lock is in said unlocked condition to facilitate said lid to be opened.

3. The assembly according to claim 2, wherein said scale comprises a base having a top side and a bottom side, said base being disposed on said bottom wall of said cooler having said top side being directed toward said bottom wall wherein said bottom side of said base is configured to rest on a support surface.

4. The assembly according to claim 3, wherein said scale includes a plurality of weight sensors, each of said weight sensors being positioned between said bottom wall of said cooler and said top side of said base, each of said weight sensors sensing the weight of said bottom wall of said cooler.

5. The assembly according to claim 4, wherein:
said scale includes a scale control circuit being integrated into said base, each of said weight sensors being electrically coupled to said scale control circuit such that said scale control circuit receives a weight signal from each of said weight sensors, said scale control circuit storing data comprising the weight of a canned beverage and the weight of said cooler when said cooler is empty;
said scale control circuit compares said weight signal against said data to determine the difference between the weight communicated by said weight signal and the weight of said cooler when said cooler is empty wherein said scale control circuit is configured to determine the number of cooled beverages that is being stored in said cooler; and
said scale control circuit generates a number signal based on the difference between the weight communicated by said weight signal and the weight of said cooler.

6. The assembly according to claim 1, wherein said scale includes a display being integrated into said forward face of said housing wherein said display is configured to be visible to the user, said display being electrically coupled to said display control circuit, said display displaying indicia comprising numbers corresponding to said number signal wherein said display is configured to visually display the number of cooled beverages that are being stored in said cooler.

7. A weight sensing cooler assembly for determining the number of cooled beverages that are being stored, said assembly comprising:
a cooler being comprised of a thermally insulating material wherein said cooler is configured to store cooled beverages, said cooler having a bottom wall and an outer wall extending upwardly therefrom, said outer wall having a distal edge with respect to said bottom wall to define an opening into said cooler;
a lock being coupled to said outer wall of said cooler, said lock being positioned adjacent to said distal edge of said outer wall, said lock having a lever being rotatably integrated into said lock wherein said lever is configured to be manipulated, said lever moving said lock between a locked condition and an unlocked condition;
a lid being hingedly coupled to said cooler for opening and closing said cooler, said lid being comprised of a thermally insulation material wherein said lid is configured to facilitate storing the cooled beverages, said lid having a lower surface, a front edge and a back edge, said back edge being hingedly coupled to said distal edge of said outer wall of said cooler, said lower surface having a recess extending around an entire perimeter of said lid, said recess accommodating said distal edge of said outer wall when said lid is closed;
an engagement being coupled to said front edge of said lid, said engagement engaging said lock when said lid is closed, said engagement being locked to said lock when said lock is in said locked condition to inhibit said lid from being opened, said engagement being unlocked from said lock when said lock is in said unlocked condition to facilitate said lid to be opened;
a scale being movably integrated into said cooler such that said scale is in mechanical communication with said cooler, said scale measuring the weight of said cooler, said scale comparing the weight of said cooler against a pre-determined baseline weight to determine the number of cooled beverages in said cooler, said scale comprising:

a base having a top side and a bottom side, said base being disposed on said bottom wall of said cooler having said top side being directed toward said bottom wall wherein said bottom side of said base is configured to rest on a support surface;

a plurality of weight sensors, each of said weight sensors being positioned between said bottom wall of said cooler and said top side of said base, each of said weight sensors sensing the weight of said bottom wall of said cooler; and a scale control circuit being integrated into said base, each of said weight sensors being electrically coupled to said scale control circuit such that said scale control circuit receives a weight signal from each of said weight sensors, said scale control circuit storing data comprising the weight of a canned beverage and the weight of said cooler when said cooler is empty, said scale control circuit comparing said weight signal against said data to determine the difference between the weight communicated by said weight signal and the weight of said cooler when said cooler is empty wherein said scale control circuit is configured to determine the number of cooled beverages that is being stored in said cooler, said scale control circuit generating a number signal based on the difference between the weight communicated by said weight signal and the weight of said cooler;

a power supply being positioned in said base, said power supply being electrically coupled to said scale control circuit, said power supply comprising at least one battery; and a display unit being coupled to said cooler wherein said display unit is configured to be visible to a user, said display unit being in electrical communication with said scale thereby facilitating said display unit to display a visual representation of the number of the cooled beverages in said cooler wherein said display unit is configured to communicate the number of cooled beverages to the user, said display unit comprising:

a housing being coupled to said outer wall of said cooler, said housing having a forward face;

a display control circuit being positioned in said housing, said display control circuit being electrically coupled to said scale control circuit such that said display control circuit receives said number signal from said scale control circuit; and a display being integrated into said forward face of said housing wherein said display is configured to be visible to the user, said display being electrically coupled to said display control circuit, said display displaying indicia comprising numbers corresponding to said number signal wherein said display is configured to visually display the number of cooled beverages that are being stored in said cooler.

\* \* \* \* \*